United States Patent [19]

Bourne

[11] 4,270,518

[45] Jun. 2, 1981

[54] CONTROLLER FOR CONDENSER-SIDE-STORAGE SOLAR HEAT-PUMP SYSTEMS

[75] Inventor: Richard C. Bourne, Davis, Calif.

[73] Assignee: The Board of Regents of the University of Nebraska Regents Hall, Lincoln, Nebr.

[21] Appl. No.: 34,734

[22] Filed: Apr. 30, 1979

[51] Int. Cl.³ .............................................. F24J 3/02
[52] U.S. Cl. .................................. 126/422; 62/238.6; 62/238.7
[58] Field of Search ................ 126/422, 430; 237/2 B; 62/2, 238 E, 324 D

[56] References Cited

U.S. PATENT DOCUMENTS

| | | | |
|---|---|---|---|
| 4,019,679 | 4/1977 | Vogt et al. | 237/2 B |
| 4,060,195 | 11/1977 | Rapp | 126/430 |
| 4,129,118 | 12/1978 | Banke | 126/422 |
| 4,167,965 | 9/1979 | Rogers | 237/2 B |
| 4,190,199 | 2/1980 | Cawley et al. | 237/2 B |
| 4,191,166 | 3/1980 | Saarem et al. | 126/430 |
| 4,211,207 | 7/1980 | Molivadas | 237/2 B |

OTHER PUBLICATIONS

"Solar Heating System Controller", by J. K. Radcliffe, IBM Technical Disclosure Bulletin, vol. 20, No. 11B, Apr. 1978.

Primary Examiner—Herbert F. Ross
Attorney, Agent, or Firm—Vincent L. Carney

[57] ABSTRACT

To improve the efficiency of a condenser-side-storage solar heat-pump system, the controller for the heat pump measures the temperature outside the house and: (1) subtracts it from the temperature within a collector for the solar heat system; and (2) adds the product of a minimum temperature which is set for the solar heat system storage in accordance with the season and a constant factor. If this sum is greater than the product of storage temperature and the same constant factor, the heat pump is run. This mode of operation causes the heat pump to: (1) store to higher temperatures during full sun conditions; (2) run continuously during low storage conditions; and (3) bias towards sunny weather operation.

33 Claims, 4 Drawing Figures

CONTROLLER FOR CONDENSER-SIDE-STORAGE SOLAR HEAT-PUMP SYSTEMS

This invention relates to solar heat-pump systems and more particularly to controllers for solar heat-pump systems.

One class of solar heating system utilizes a collector for collecting solar thermal energy and a store which stores the solar energy for later use. In one type of this class of solar systems, a heat pump is included. Usually the heat pump operates during a heating cycle with the evaporator in the store but it is also known in the prior art to operate with the condenser in the store and the evaporator in the collector. This latter type of system is called a condenser-side-storage solar heat-pump system.

In a prior art type of condenser-side-storage solar heat-pump system, the heat pump is controlled by a time clock so that the heat pump is activated at a preset time each day and operated until either an upper limit storage temperature is achieved or the time elapses. This type of system may include an automatic air exchange system to circulate outdoor air to the collector for heat-pump operation when solar energy is not available.

This prior art system has several disadvantages such as: (1) the heat pump operates more hours than necessary in cloudy weather to extract heat from relatively cool air; (2) the heat pump recovers heat from outdoor air at night more frequently than necessary because the building thermostat demands heat when the storage temperature is inadequate to satisfy the thermostat; (3) the heat pump operates for more hours of operation with outdoor air as a source than with solar energy as a source through a typical heating season and is thereby reduced in efficiency and caused to operate more hours per day; (4) the heat pump operates only for a short time under good conditions during sunny days; and (5) certain of the prior art systems were complex because they coupled heat-pump operation to instantaneous demand in the house under some circumstances.

Accordingly, it is an object of the invention to provide an improved condenser-side-storage solar heat-pump system.

It is a further object of the invention to provide an improved controller for heat pumps used in solar heat-pump systems.

It is a still further object of the invention to provide an improved method of operation for solar heat-pump systems.

It is a still further object of the invention to provide a heat system which stores to higher temperatures during full sun conditions than during cloudy days.

It is a still further object of the invention to provide a solar heat-pump system which runs continuously during low storage temperature conditions.

It is a still further object of the invention to provide a solar heat-pump system which is biased toward sunny weather operation.

It is a still further object of the invention to provide a controller for a solar heat-pump system which is relatively simple in construction.

It is a still further object of the invention to provide a solar heat-pump system which does not operate in response to instantaneous demand directly from the house.

In accordance with the above and further objects of the invention, a condenser-side-storage solar heat-pump system includes a controller that measures the temperature of outdoor air, the temperature of the collector and the temperature of storage and controls the heat pump to cause it to: (1) operate to store to higher temperatures during full sun conditions; (2) run continuously during low storage conditions; and (3) bias its time of operation toward sunny weather operation rather than toward cloudy days.

The controller advantageously generates a difference signal from temperature signals generated by the collector and outdoor temperature sensors respectively. An adjustable signal representing the product of a minimum desired storage temperature and an adjustable factor which may be changed from season to season for maximum efficiency is then added to the adjusted difference signal. When this sum is greater than a base signal generated by the storage temperature sensor multiplied by the same adjustable factor, the heat pump is activated.

From the above description it can be understood that the controller of this invention has the advantages of: (1) reducing the number of hours the heat pump must operate; (2) causing it to operate under more favorable conditions; and (3) being relatively inexpensive because it does not need control components to cause the heat pump to run in response to instantaneous demands for heating or cooling within the house. This increases the economic attractiveness of condenser-side-storage solar heat-pump systems which have several other advantages such as: (1) lower cost; (2) ability to operate during off peak electrical generating hours, particularly during the summer; and (3) having access to outdoor air as a heat source for auxiliary heating when storage temperatures are too low for space heating.

The above noted and other features of the invention will be better understood from the following detailed description when considered with reference to the accompanying drawings in which.

Figure 1:
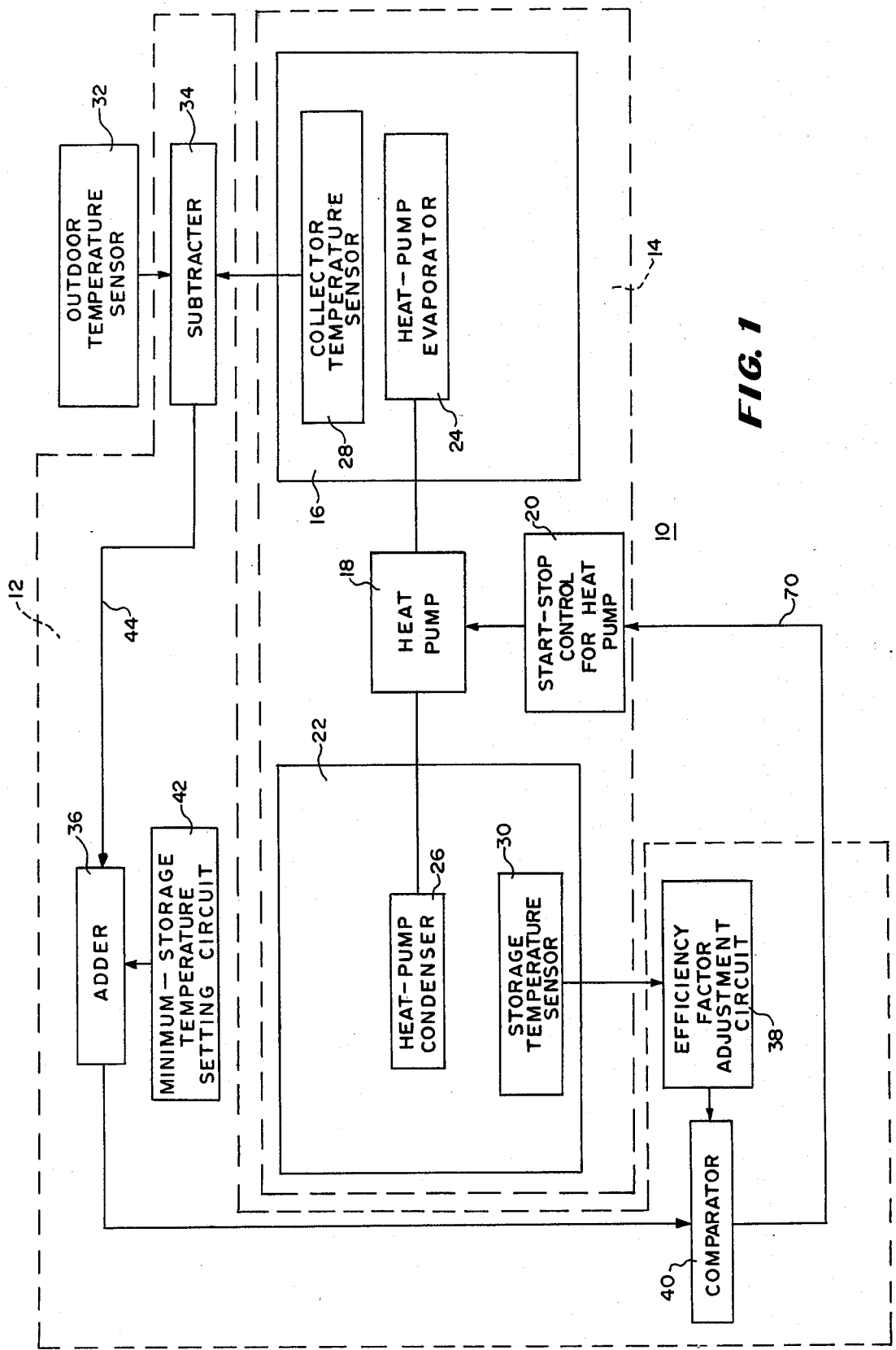
FIG. 1 is a block diagram of the condenser-side-storage solar heat-pump system in accordance with the invention.

In FIG. 1, there is shown a condenser-side-storage solar heat-pump system 10 having a controller 12 for a solar heat-pump system 14. The controller 12 is connected to the heat-pump system 14 and controls the time that the heat pump within the heat-pump system 14 runs to transfer heat to the heat store of the solar heat-pump system.

To collect solar heat and store it for later heating of a house, the solar heat-pump system 14 includes a collector 16, a heat pump 18, a start-stop control 20 for the heat pump, and a store 22. A heat-pump evaporator 24 is within the collector 16 and a heat-pump condenser 26 is in the storage 22 for cooperation with the remainder of the heat pump 18 to transfer heat between the store 22 and the solar collector 16. A collector temperature sensor 28 is positioned within the collector 16 and a storage temperature sensor 30 is within the store 22 to provide signals to the controller 12 for controlling the heat pump. The start-stop control 20 for the heat pump is connected to the heat pump 18 to start and stop it and to the controller 12 for the heat-pump system. The evaporator and condenser are labelled separately in drawings (FIG. 1) for purposes of illustration although they are actually part of the heat pump 18.

To control the time of running the heat pump 18, the controller 12 includes an outdoor temperature sensor 32, the collector temperature sensor 28, the storage temperature sensor 30, subtractor 34, adder 36, an efficiency factor adjustment circuit 38, a comparator 40 and an adjusted minimum storage temperature setting circuit 42. With these components, the controller 12 operates the solar heat-pump system 14 to: (1) store heat in the storage 22 to raise it to a higher temperature during sunny weather, which will generally cause collector temperature to exceed outdoor temperature; (2) run continuously when the temperature is low in the storage unit 22 and when the condenser-side-storage solar heat-pump system 10 is in the heating mode; and (3) bias the heat-pump system 14 toward operation during sunny weather.

To store to a higher temperature during sunny weather, the subtractor 34 has its positive input terminal electrically connected to the collector temperature sensor 28 and its negative input terminal electrically connected to the outdoor temperature sensor 32 to provide on a conductor 44 the difference between the temperature within the collector 16 and the temperature outside of the unit that is being heated.

To cause the heat pump 18 to run continuously during low storage temperature conditions and to establish restraints on the biasing and storing to a higher temperature for sunny weather operation, the adder 36 sums the currents from conductor 44 and the adjusted minimum storage temperature setting circuit 42, whose signal represents the product of desired minimum storage temperature and the efficiency factor.

The output of the adder 36 is connected to one input of the comparator 40 and the other end of the comparator 40 is electrically connected to the storage temperature sensor 30 through an efficiency factor adjustment circuit 38. The output of the comparator 40 is electrically connected to the start-stop control 20 for the heat pump to control a relay which operates the heat pump 18. If the signal from the adder 36 is greater than the signal from the storage temperature sensor 30 after adjustment by the efficiency factor adjustment circuit 38, then the heat pump will operate, and when it is lower, the heat pump will not operate.

The controller 12 shown in FIG. 1 performs the desired objectives of: (1) raising the temperature of the storage 22 to higher temperatures during full sun conditions in a heating operation; (2) running continuously during low temperatures of the storage 22; and (3) biasing the operation of the heat pump 18 so that it operates in sunny weather more readily than in cloudy weather. However, it is not the only specific block diagram which can accomplish these purposes and other arrangements may be used.

Generally the design shown in FIG. 1 is based on a ratio having as its numerator the difference between the outside temperature and the collector temperature and as its denominator the difference between the storage temperature and a minimum temperature arbitrarily set for storage. When the ratio is greater than a predetermined constant, the heat pump operates.

The design may also be expressed in other ways such as by considering that the collector temperature minus the outside temperature and an efficiency factor k multiplied by a set minimum temperature must be greater than the efficiency factor multiplied by the storage temperature. For example, the multiplied factor may be a 2 and the minimum storage temperature may be 95 degrees Fahrenheit.

When the criterium for operation of the heat pump is expressed as a fraction of the collector temperature minus the outside temperature divided by the storage temperature minus the minimum temperature, it can be easily understood that as the outside temperature increases with respect to the collector temperature the expression becomes smaller and eventually becomes less than k in which case the heat pump be stopped. If the collector temperature on a sunlit day increases with respect to the outside temperature on the other hand, the fraction becomes greater and eventually equals k causing the heat pump to start. As the storage temperature decreases, the fraction becomes larger and eventually it equals k and causes the heat pump to start. The reverse is true as the storage temperature becomes larger. When the storage temperature is close to the preset minimum temperature, the heat pump is running.

When the relationship causing heat pump operation is expressed as the collector temperature minus the outside temperature plus an efficiency factor multiplied by the minimum temperature for storage being greater than the efficiency factor times storage temperature, it can be understood that as the storage temperature decreases the expressions become closer to being equal and when they are equal the heat pump starts. Similarly, as the collector temperature increases with respect to the outside temperature and a set minimum temperature, the expression approaches k.

Obviously, many different circuit elements can be used to establish the desired relationship. Moreover, approximations may be substituted for the equations that have heretofore been discussed. For example, the signals may be digitized and digital circuits may be used to perform indicated arithmetic operations.

Figure 2:
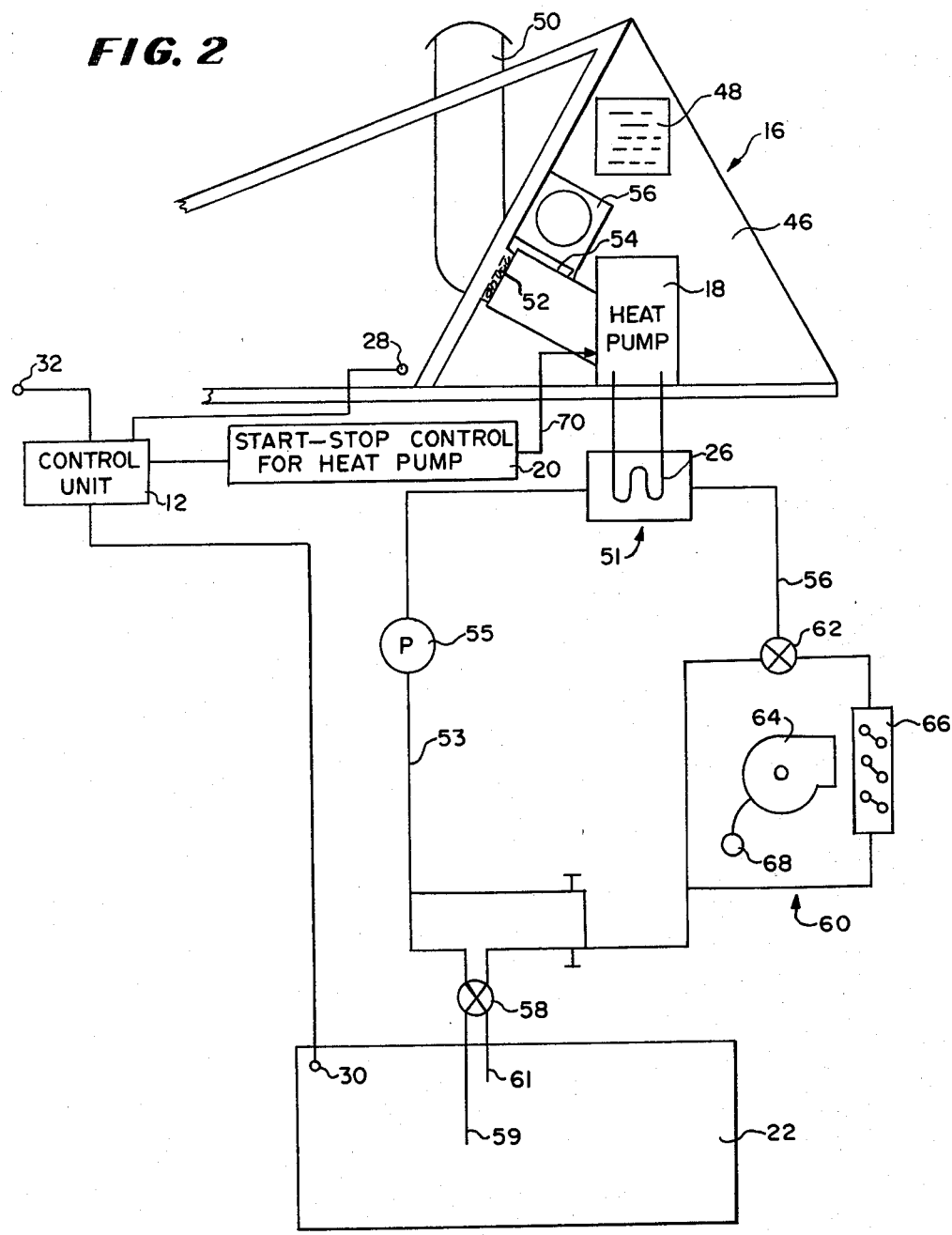
FIG. 2 is a schematic diagram showing the embodiment of FIG. 1 within a house.

In FIG. 2, there is shown schematically a house adapted to be heated and cooled by a solar heat pump, with the condenser side of the heat pump communicating with the heat store. This type of house is more fully disclosed in the thesis of Roger A. Eigenberg, entitled "A Microprocessor-Based Control For a Solar Heating System", July, 1976, University of Nebraska, Lincoln, Nebr.

As best shown in FIG. 2, the collector 16 can conveniently be the attic of a house having a collector 46 being a transparent window facing south and opening into an attic enclosure for the gathering of heat within a collector. Within the collector is a shutter 48 which allows outdoor air to enter the collector and an exhaust pipe 50 which can allow air to be exhausted from the collector.

Within the pipe 50 is a movable damper 52 shown blocking the vent and being adapted to being moved in an upward position to 54 under the control of a solenoid operated lever 56 to cause outdoor air to pass through the collector and out of the pipe 50 to permit continuous heat-pump operation when solar energy is not available as a heat source to the evaporator. Also mounted within the collector 16 is the collector temperature sensor 28 which may be a thermister and the heat pump 18, having mounted to it the evaporator 24 (not shown in FIG. 2).

At another location, usually within the house or beneath the house, is the store 22, which in the preferred embodiment is a water storage tank, having within it the temperature sensor 30 which is electrically connected to the controller 12. The outside temperature sensor 32 is also electrically connected to the controller 12. The start-stop control 20 for the heat pump is electrically connected to the controller 12 and to the heat pump 18 to control the heat pump in the manner described with respect to FIG. 1.

The condenser 26 is within a water circulation path which includes the heat exchanger 51 and the conduits 53 and 56 through which water is circulated by the pump 55. A valve 58 connects the conduits 53 and 56 and a blower system 60 with the water storage tank 22 so that water may circulate under pump pressure from the water storage tank through the heat exchanger 51 and the air blower system 60 back to the water storage tank 22.

To supply heat from the circulating water to the house, the blower unit 60 includes a valve 62, a blower 64, water coils 66 and a thermostatic control 68. The blower 64 is positioned to blow air across the coils 66 and thus transfer heat to air for heating the house or from air for cooling the house.

The valve 62 can be positioned to cause fluid to flow from the conduit 56 through the cooling coils 66 and back into storage or to bypass the coils and flow directly to storage. The valve 58 can be adjusted so that: (1) during a heating cycle, fluid flows from storage through a conduit 59 with its orifice near the bottom of the water storage tank, the pump 55, the heat exchange 51 and the coils 66 and back into the tank through a conduit 61 having its opening positioned near the top of the tank; and (2) during cooling is pumped from the conduit 61 through the pump 55, the heat exchanger 51, the cooling coils 66 and back into storage 22 through the conduti 59. This is for better mixing of the liquid in store 22.

The heat pump 18 operates to reverse the condenser and evaporator in the heat exchanger 51 to operate either as a heater or cooler. During the winter, the control unit operates the heat pump during the day during full sunlight and during the summer for cooling its operates at night.

The water storage 22 is of sufficient capacity to provide adequate cooling with operation of the heat pump only during off peak hours in summer. For a house of approximately 1,000 sq. feet in Lincoln, Neb., one thousand six hundred and eighty gallons of water has been found to be suitable.

The water can be cycled between 125 degrees Fahrenheit and 100 degrees Fahrenheit for heating purposes. For cooling, the water limit is set at 45 degrees Fahrenheit and is cycled up to 55 degrees Fahrenheit. During the cooling operation, the damper 52 is raised to the position 54 and the shutters are open to provide cooling action to the condenser within the collector 46. To control cooling, a time clock is appropriate to ensure off peak operation although the system could operate the opposite of its operation for heating by maintaining the temperature of storage below a certain minimum and biasing heat-pump operation toward cool weather by operating when the outdoor temperature is below a preset maximum.

Figure 3:
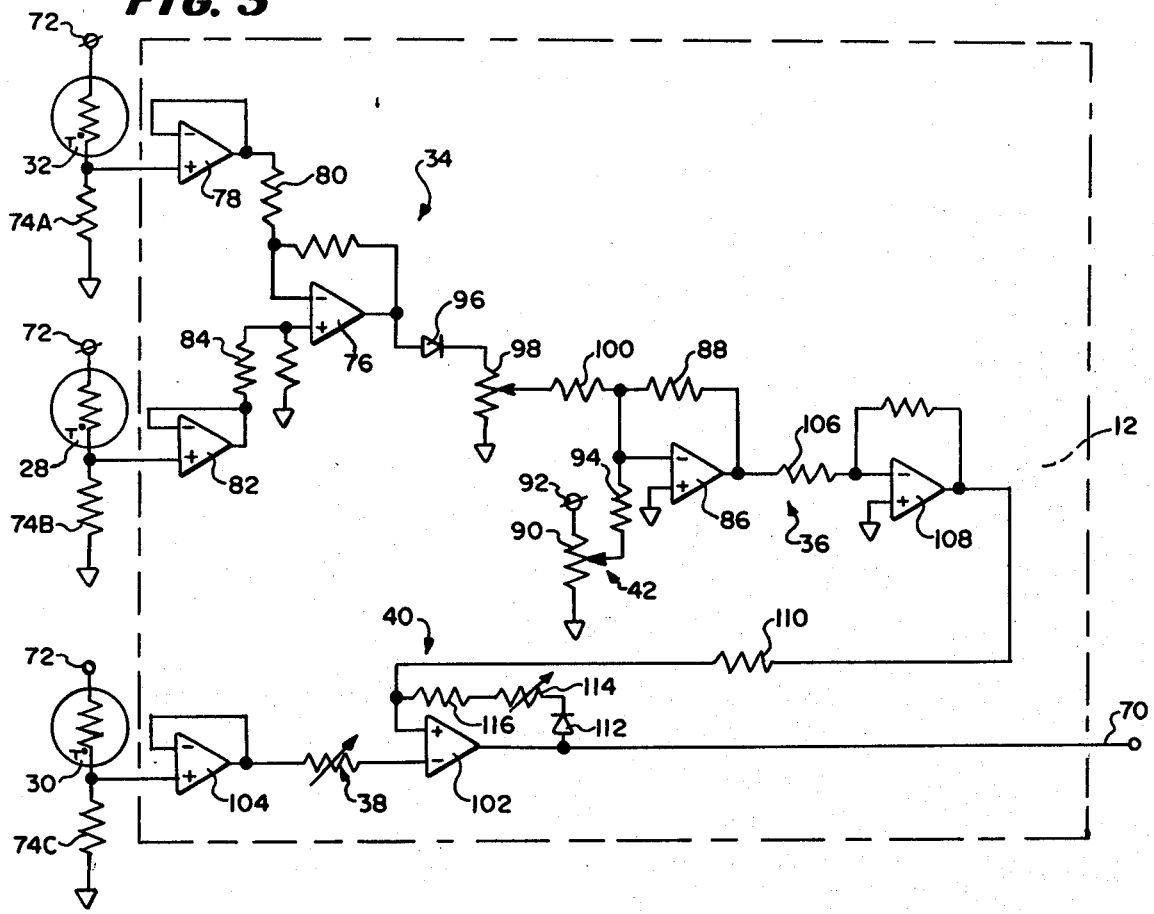
FIG. 3 is a schematic circuit diagram of a portion of the embodiment of FIG. 1.

In FIG. 3, there is shown a schematic circuit diagram of the controller 12, electrically connected to the temperature sensors 28–32 and to conductor 70 which leads to the start-stop control 20 (FIG. 1) for the heat pump 18 (FIG. 1), which is a relay in the preferred embodiment. As shown in FIG. 3, the temperature sensors 28–32 are thermistors and are each connected to a source of potential 72 at one terminal and to ground through a different one of the resistors 74A, 74B and 74C on the opposite terminal.

To subtract the outside temperature from the temperature of the collector, the subtractor 34 includes a differential amplifier 76 having: (1) its negative or inverting terminal electrically connected to a thermistor 32 and the adjacent end of the resistor 74A through a buffer amplifier 78 and a resistor 80 in series; and (2) has its non-inverting or positive input terminal electrically connected to the thermistor 28 and the adjacent end of the resistor 74B through a buffer amplifier 82 and a resistor 84 in series.

To set the minimum temperature for storage, the controller 12 includes an operational amplifier 86 and the minimum storage temperature setting circuit 42. The operational amplifier 86 acts as a summing amplifier and for that purpose has a feedback resistor 88 connected from its output to its negative input terminal.

The minimum storage temperature setting circuit 42 includes a potentiometer 90 having one terminal electrically connected to a source of potential 92 and its other terminal grounded, with its movable tap electrically connected through a resistor 94 to the negative input terminal of the operational amplifier 86.

The output of the differential amplifier 76 is electrically connected through the forward resistance of a diode 96 through a potentiometer 98 and a resistor 100 to the negative input terminal of operational amplifier 86 so that the output of the subtractor 34 is electrically connected to the output of the minimum storage temperature setting circuit 42 in the operational amplifier 86.

To compare the storage temperature adjusted by an efficiency factor with the difference between the collector temperature, the outside temperature and a minimum storage temperature factor, the controller 12 includes the comparator circuit 40 having a differential amplifier 102 within it. The differential amplifier 102 has its negative or inverting terminal electrically connected to the thermistor 30 adjacent to the resistor 74C through a buffer amplifier 104 and an adjustable potentiometer 38, which serves as the efficiency factor adjustment circuit. By adjusting the resistance in the potentiometer 38, a potential proportional to the temperature in the storage compartment 22 multipled by an adjustable factor is applied to the inverting terminal of the differential amplifier 102.

The positive or non-inverting terminal of the differential amplifier 102 is electrically connected to the output of the amplifier 86 through a resistor 106, an operational amplifier 108 and a resistor 110. Hysteresis is provided by a diode 112, a potentiometer 114 and a resistor 116 electrically connected in circuit between the output of the amplifier 102 and its non-inverting input, with the anode of the diode 112 being electrically connected to the output of the operational amplifier 102. The output of the operational amplifier 102 is connected to the conductor 70 to energize the relay which causes the heat pump to begin operation.

The efficiency factor adjustment circuit 38 and the minimum storage temperature setting circuit 42 are significant because of differences between the seasons. It is desirable to cool the storage water some as summer approaches and to warm the water as winter approaches so as to avoid the need for sudden drastic changes. These factors are taken into account by selective adjustment based on experience. The proper settings of the potentiometer are determined experimentally for different climates.

Figure 4:
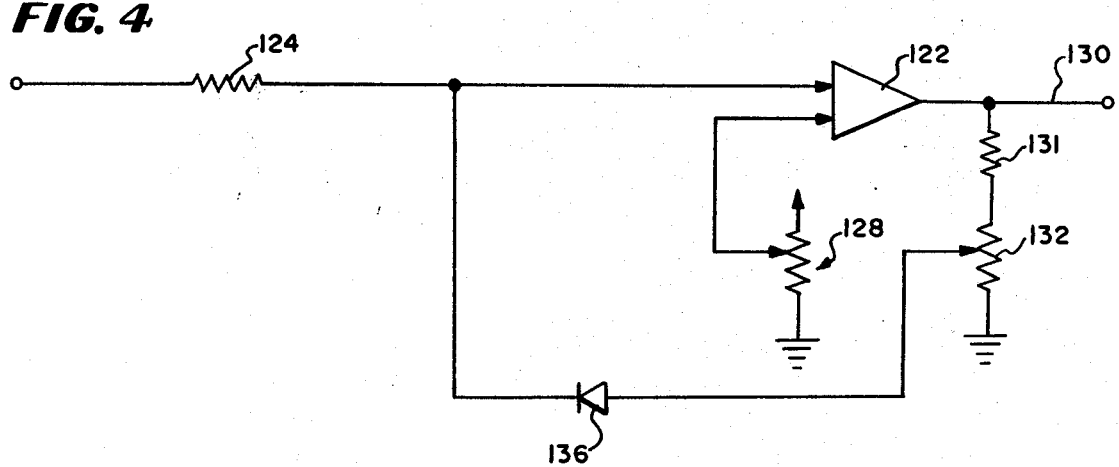
FIG. 4 is a schematic circuit diagram of a portion of a damper control circuit useful with the embodiment of FIG. 1.

In FIG. 4, there is shown a circuit suitable for automatically opening and closing the damper 52 (FIG. 2) to permit air to circulate through the collector. It includes a differential amplifier 122 having its inverting input terminal electrically connected to the output of amplifier 76 (FIG. 3) through a resistor 124 to receive a signal representing the collector temperature subtracted from a signal representing the outdoor temperature. The positive input terminal of amplifier 122 is electrically connected to an adjustable source of potential 128 to cause its output to be applied to the damper control through a conductor 130 when the outside temperature differs from the collector temperature by a preset amount. Hysteresis is provided by a feedback circuit including conductor 130, a resistor 131, a potentiometer 132, the forward resistance of a diode 136, and the inverting input of amplifier 122 in series in the order named.

From the above description, it can be understood that the solar heat pump of this invention has several advantages. Firstly, it has the advantages that are inherent in a condenser-storage solar heat-pump arrangement, which are: (1) it is lower in cost since an air source evaporator may be located in a large sunlit chamber without the need for flat plate collectors; (2) the heat pump has access to outdoor air as a heat source for auxiliary heating when storage temperatures are too low for space heating; (3) by reversible operation of the heat pump, cooling may be provided with the use of electricity during off peak hours when demand is lowest, an advantage which is also available to a lesser extent during the winter by off peak loading of electricity for heat; and (4) cycling is reduced since the heat pump is decoupled from the house load.

The controller, in addition to increasing the advantages of condenser-storage type solar heat pumps described above, has the advantages of: (1) reducing the number of hours of operation for the same result by storing to higher temperatures during full sun conditions, running continuously during low storage temperature conditions and biasing toward sunny weather operation; and (2) being relatively simple in construction because it does not respond to instantaneous demands from within the house but instead operates only in response to outside weather conditions and storage temperature and collector temperatures. Thus, signals from inside the house such as by setting the thermostat are buffered by the large slow changing storage.

Although a preferred embodiment of the invention has been described with some particularity, many modifications and variations are possible in the preferred embodiment without deviating from the invention. Therefore, it is to be understood that, within the scope of the appended claims, the invention may be practiced other than as specifically described.

What is claimed is:

1. A method of operating a solar heat pump, comprising the steps of:
    periodically transferring heat from the solar collector to a storage medium;
    said step of periodically transferring heat including the step of operating a heat pump to transfer the heat from the solar collector to the storage medium periodically; and
    the step of operating the heat pump including the step of operating the heat pump for longer periods of time as one of the temperature difference between the collector and outdoors decreases and storage temperature decreases.

2. A method according to claim 1 in which the step of operating a heat pump further includes the step of operating the heat pump to increase the temperature of the storage medium to higher temperatures during bright sunlit conditions than during cloudy weather.

3. A method according to claim 2 in which the step of operating a heat pump further includes the step of running the heat pump continuously when the temperature of the storage medium falls below a predetermined temperature.

4. A method according to claim 3 in which the step of operating a heat pump includes the steps of:
    measuring the temperature within the collector;
    measuring the outside temperature; and
    operating the heat pump for longer periods of time in relation to the amount the temperature inside the collector exceeds the outside temperature.

5. A method according to claim 4 further comprising the steps of:
    comparing the difference between the outside temperature and the temperature in the collector with the temperature of the storage medium; and
    operating the heat pump for a longer time in relation to the amount the difference between the collector temperature and the outside temperature exceeds the storage temperature.

6. A method according to claim 5 further including the steps of:
    comparing a preset minimum temperature for the storage with the storage temperature; and
    operating the heat pump for longer periods of time as the ratio between the minimum temperature of storage and the temperature of the storage increases.

7. A method according to claim 1 in which the step of operating a heat pump further includes the step of running the heat pump continuously when the temperature of the storage medium falls below a predetermined temperature.

8. A method according to claim 7 in which the step of operating a heat pump includes the steps of:
    measuring the temperature within the collector;
    measuring the outside temperature; and
    operating the heat pump for longer periods of time in relation to the amount the temperature inside the collector exceeds the outside temperature.

9. A method according to claim 8 further comprising the steps of:
    comparing the difference between the outside temperature and the temperature in the collector with the temperature of the storage medium; and
    operating the heat pump for a longer time in relation to the amount the difference between the collector temperature and the outside temperature exceeds the storage temperature.

10. A method according to claim 9 further including the steps of:
    comparing a preset minimum temperature for the storage with the storage temperature; and
    operating the heat pump for longer periods of time as the ratio between the minimum temperature of storage and the temperature of the storage increases.

11. A method according to claim 2 further comprising the steps of:
comparing the difference between the outside temperature and the temperature in the collector with the temperature of the storage medium; and
operating the heat pump for a longer time in relation to the amount the difference between the collector temperature and the outside temperature exceeds the storage temperature.

12. A method according to claim 11 further including the steps of:
comparing a preset minimum temperature for the storage with the storage temperature; and
operating the heat pump for longer periods of time as the ratio between the minimum temperature of storage and the temperature of the storage increases.

13. A method according to claim 4 further including the steps of:
comparing a preset minimum temperature for the storage with the storage temperature; and
operating the heat pump for longer periods of time as the ratio between the minimum temperature of storage and the temperature of the storage increases.

14. A method of operating a solar heat pump comprising the steps of:
periodically transferring heat from the solar collector to a storage medium;
said step of periodically transferring heat including the step of operating a heat pump to transfer the heat from the solar collector to the storage medium periodically; and
the step of operating the heat pump further includes the step of running the heat pump continuously when the temperature of the storage medium falls below a predetermined temperature.

15. A method according to claim 14 further comprising the steps of:
comparing the difference between the outside temperature and the temperature in the collector with the temperature of the storage medium; and
operating the heat pump for a longer time in relation to the amount the difference between the collector temperature and the outside temperature exceeds the storage temperature.

16. Apparatus for controlling a condensor-side-storage solar heat-pump system comprising:
a solar collector;
a storage medium;
means for periodically withdrawing heat from the solar collector and transferring it to the storage medium;
said means for periodically withdrawing heat including heat-pump means for transferring the heat from the solar collector to the storage medium periodically; and
said heat-pump means including control means for operating the heat pump more as one of the temperature difference between the collector and outdoors decreases and storage temperature decreases.

17. Apparatus according to claim 16 in which the heat-pump means includes the means for operating the heat pump to increase the temperature of the storage medium to higher temperatures during bright sunlit conditions than during cloudy weather.

18. Apparatus according to claim 17 in which the heat-pump means includes means for running the heat pump continuously when the temperature of the storage medium falls below a predetermined temperature.

19. Apparatus according to claim 18 in which the heat-pump means includes collector temperature sensing means for measuring the temperature within the solar collector and the outside temperature sensing means for measuring the temperature outside of the solar collector and means for operating the heat pump longer the greater collector temperature is with respect to the outside temperature.

20. Apparatus according to claim 19 further comprising:
storage medium temperature sensing means for measuring the temperature of the storage medium;
means for comparing the difference between the outside temperature and the temperature in the collector with the temperature of the storage medium; and
means for operating the heat pump for longer times as the difference between the collector temperature and the outside temperature becomes larger than the temperature of the storage medium.

21. Apparatus according to claim 20 further including:
adjustable means for setting a preset minimum temperature for the storage medium;
means for comparing a preset minimum temperature for the storage medium with the storage medium temperature; and
means for operating the heat pump for a longer period of time as the minimum temperature of storage is a larger portion of the temperature of the storage.

22. Apparatus according to claim 16 further comprising:
storage medium temperature sensing means for measuring the temperature of the storage medium;
means for comparing the difference between the outside temperature and the temperature in the collector with the temperature of the storage medium; and
means for operating the heat pump for longer times as the difference between the collector temperature and the outside temperature becomes larger than the temperature of the storage medium.

23. Apparatus according to claim 16 further including:
adjustable means for setting a preset minimum temperature for the storage medium;
means for comparing a preset minimum temperature for the storage medium with the storage medium temperature; and
means for operating the heat pump for a longer period of time as the minimum temperature of storage is a larger portion of the temperature of the storage.

24. Apparatus according to claim 16 in which said means for periodically withdrawing heat from the solar collector and transferring to the storage medium comprises:
heat-pump evaporator means for withdrawing heat from the solar collector; and
heat-pump condensor means for releasing heat into the storage medium.

25. Apparatus according to claim 21 in which said means for periodically withdrawing heat from the solar collector and transferring to the storage medium comprises:
- heat-pump evaporator means for withdrawing heat from the solar collector; and
- heat-pump condensor means for releasing heat into the storage medium.

26. Apparatus according to claim 22 in which said means for periodically withdrawing heat from the solar collector and transferring to the storage medium comprises:
- heat-pump evaporator means for withdrawing heat from the solar collector; and
- heat-pump condensor means for releasing heat into the storage medium.

27. Apparatus comprising:
- a solar collector;
- a storage medium;
- means for periodically withdrawing heat from the solar collector and transferring it to a storage medium;
- said means for periodically transferring heat including a heat-pump means for transferring the heat from the solar collector to the storage medium periodically; and
- means for operating the heat-pump means includes means for running the heat-pump means continuously when the temperature of the storage medium falls below a predetermined temperature.

28. Apparatus according to claim 27 in which said means for operating the heat pump means includes means for operating the heat-pump means longer during sunny weather than during cloudy weather.

29. Apparatus according to claim 28 in which the means for operating the heat pump further includes the means for operating the heat pump to increase the temperature of the storage medium to higher temperatures during bright sunlit conditions than during cloudy weather.

30. Apparatus according to claim 29 in which the means for operating the heat pump further includes the means for running the heat pump continuously when the temperature of the storage medium falls below a predetermined temperature.

31. Apparatus according to claim 30 in which said means for comparing includes:
- a subtractor;
- means for sensing the temperature in said collector connected to one of said inputs of said subtractor; and
- means for measuring the outdoor temperature connected to the other of the inputs of said subtractor.

32. Apparatus according to claim 31 in which said means for comparing the minimum temperature of the storage medium includes:
- a second subtractor having first and second input terminals and an output terminal;
- the first of said input terminals of said second subtractor being connected to the output terminal of said first subtractor;
- the second input terminal of said subtractor being connected to an adjustable source of potential;
- a comparator;
- the output of said second subtractor being connected to one of the inputs of said comparator;
- means for measuring the temperature of said storage medium;
- means for adjusting the amplitude of the temperature of said storage medium; and
- said second terminal of said comparator being connected to the means for adjusting the signal from the means for measuring the temperature of said storage medium, whereby the output from said comparator indicates a comparison between the outside temperature and the collector temperature with the minimum temperature of said storage medium and the temperature of said storage medium.

33. Apparatus according to claim 27 in which said means for periodically withdrawing heat from the solar collector and transferring to the storage medium comprises:
- heat-pump evaporator means for withdrawing heat from the solar collector; and
- heat-pump condensor means for releasing heat into the storage medium.

* * * * *

UNITED STATES PATENT AND TRADEMARK OFFICE
CERTIFICATE OF CORRECTION

PATENT NO. : 4,270,518
DATED : June 2, 1981
INVENTOR(S) : Richard C. Bourne

It is certified that error appears in the above—identified patent and that said Letters Patent is hereby corrected as shown below:

Column 2, line 11, change "difference" to --different--.

Column 2, line 17, change "difference" to --different--.

Column 4, line 14, after "heat pump" insert "will".

Column 4, line 30, after "creases" insert ",".

Column 4, line 49, change "Nebr." to --Nebraska--.

Column 4, line 66, change "thermister" to --thermistor--.

Column 5, line 45, change "its operates" to --it operates--.

Column 5, line 49, change "Nebr." to --Nebraska--.

UNITED STATES PATENT AND TRADEMARK OFFICE
CERTIFICATE OF CORRECTION

PATENT NO. : 4,270,518
DATED : June 2, 1981
INVENTOR(S) : Richard C. Bourne

It is certified that error appears in the above—identified patent and that said Letters Patent is hereby corrected as shown below:

Column 10, line 11, after "greater" insert "the".

Signed and Sealed this

Ninth Day of March 1982

[SEAL]

Attest:

GERALD J. MOSSINGHOFF

*Attesting Officer*       *Commissioner of Patents and Trademarks*